(12) United States Patent
Kim et al.

(10) Patent No.: US 6,811,263 B2
(45) Date of Patent: Nov. 2, 2004

(54) COLORED LIGHT SEPARATING DEVICE AND SINGLE-PANEL COLOR IMAGE DISPLAY APPARATUS USING THE SAME

(75) Inventors: Sung-ha Kim, Gyeongi-do (KR); Kun-ho Cho, Cyconggi-do (KR); Dae-sik Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/654,616

(22) Filed: Sep. 4, 2003

(65) Prior Publication Data

US 2004/0105266 A1 Jun. 3, 2004

(30) Foreign Application Priority Data

Sep. 4, 2002 (KR) .................................. 10-2002-0053160

(51) Int. Cl.[7] .................. G03B 21/00; G03B 21/14; G03B 21/20; G03B 21/28; F21V 9/00
(52) U.S. Cl. .................. 353/31; 353/34; 353/84; 353/98; 353/99; 353/102; 359/308; 362/293; 348/743; 349/5; 349/7; 349/8

(58) Field of Search .............. 353/31, 20, 34, 353/69, 84, 98, 99, 102; 359/308; 362/293; 348/743, 744, 771; 349/5, 6, 7, 8

(56) References Cited

U.S. PATENT DOCUMENTS 6,334,685 B1 * 1/2002 Slobodin .................. 353/31
6,642,969 B2 * 11/2003 Tew .......................... 348/743

* cited by examiner

Primary Examiner—David Gray
Assistant Examiner—Melissa J Koval
(74) Attorney, Agent, or Firm—Staas & Halsey LLP

(57) ABSTRACT

A colored lighting separating device and a single-panel color image display apparatus using the same include a colored light separator having a plurality of dichroic filters to separate incident light into a plurality of colored light beams and a driving device which moves the colored light separator to scroll the separated colored light beams. The colored light separating device performs color scrolling by driving the colored light separator itself so that the structure of the colored light separating device enabling color scrolling is simplified, continuity and consistency of the color scrolling are guaranteed, and the scrolling speed of color bars are kept constant.

26 Claims, 10 Drawing Sheets

COLORED LIGHT SEPARATING DEVICE AND SINGLE-PANEL COLOR IMAGE DISPLAY APPARATUS USING THE SAME

CROSS-REFERENCE TO RELATED APPLICATIONS

This application claims the benefit of Korean Patent Application No. 2002-53160, filed on Sep. 4, 2002, in the Korean Intellectual Property Office, the disclosure of which is incorporated herein in its entirety by reference

BACKGROUND OF THE INVENTION

1. Field of the Invention

The present invention relates to a single-panel color image display apparatus, and more particularly, to a colored light separating device having high optical efficiency due to color scrolling and a single-panel color image display apparatus using the same.

2. Description of the Related Art

Projection type color image display apparatuses form an image by controlling the on/off operation of light emitted from a high-power lamp light source on a pixel-by-pixel basis using a micro display (which is also called a light valve) such as a liquid crystal display (LCD) or a digital micro display (DMD), magnify and project the image using a projection optical system, and provide a wide picture. Projection type color image display apparatuses are classified into a three-panel projection type and a single-panel projection type, depending on the number of micro displays.

In a general single-panel color image display apparatus, white light irradiated from a white light source is separated into red, green, and blue using a color wheel, and the three colors are sequentially sent to one micro display. The micro display operates according to the sequence of colors received, and forms an image.

The general single-panel color image display apparatus has a simpler structure and a smaller optical system than a three-panel color image display apparatus, which forms images for each color on three micro displays using an optical separation/combination system, but provides an optical efficiency of ⅓ less than that of the three-panel color image display apparatus due to the use of the color wheel. To solve the reduction problem of the optical efficiency in the general single-panel color image display apparatus using the color wheel, a single-panel color image display apparatus using a color scrolling technique has been proposed as shown in FIG. 1.

In the color scrolling technique, white light is separated into a red colored light R, a green colored light G, and a blue colored light B, and the three colors are sent to different locations on a micro display, thus forming R, G, and B color bars. Further, the color bars are moved at a constant speed in a particular method so that an image may be formed after the R, G, and B colors for each pixel reach the micro display.

Referring to FIG. 1, in a conventional single-panel image display apparatus, white light emitted from a lamp light source 30 passes through first and second lens arrays 32 and 34 and a polarizing beam splitter array 35 and is condensed by a condensing lens 37. The white light is separated into R, G, and B colors by first through fourth dichroic filters 39, 42, 69, and 52, and the R, G, and B colors are combined.

To be more specific, the red colored light R and the green colored light G are transmitted by the first dichroic filter 39 and travel along a first optical path 11, while the blue colored light B is reflected by the first dichroic filter 39 and travels along a second optical path 12. The red colored light R and the green colored light G on the first light path 11 are separated by the second dichroic filter 42. The red colored light R is transmitted by the second dichroic filter 42 and travels along the first light path 11. The green colored light G is reflected by the second dichroic filter 42 and travels along the third light path 13.

The green colored light G and the blue colored light B that travel along the second and third optical paths 12 and 13, respectively, are transmitted and reflected, respectively, by the third dichroic filter 69, and are thus combined. Finally, the R, G, and B light beams are combined by the fourth dichroic filter 52. The combined light passes through a polarizing beam splitter 57 and is incident on a micro display 60.

First through third prisms 44, 65, and 72 are disposed on the first through third optical paths 11, 12, and 13, respectively, and rotate at a uniform speed such that R, G, and B color bars are formed on the micro display 60, and are scrolled due to the rotation of the first through third prisms 44, 65, and 72.

As described above, in the conventional single-panel image display apparatus, while the white light emitted from the light source 30 is separated and combined by the first through fourth dichroic filters 39, 42, 69, and 52, color scrolling is performed as the first through third prisms 44, 65, and 72 disposed on the first through third optical paths 11, 12, and 13 rotate.

The scrolling of the R, G, and B color bars due to the rotation of the first through third prisms 44, 65, and 72 is shown in FIG. 2. FIG. 2 shows the movement of the R, G, and B color bars formed on a surface of the micro display 60 when the prisms 44, 65, and 72 corresponding to the R, G, and B colors are synchronously rotated.

The micro display 60 processes image information for each pixel to synchronize with the movement of the R, G, and B color bars and forms an image. The formed image is magnified by a projecting lens (not shown) and projected on a screen (not shown).

As described above, the conventional single-panel image display apparatus has the structure in which light is separated into individual colors and the separated colors are combined. Relay lenses 41, 47, 50, 54, 61, 67, 70, and 75, which are disposed on optical paths between optical components, send light to the polarizing beam splitter 57. Accordingly, optical paths are complicated, and multiple components are disposed on the complicated optical paths so that the conventional single-panel image display apparatus has a large optical system, and an assembling process of the multiple components is difficult.

Further, since color scrolling is performed due to the individual rotation of the three prisms 44, 65, and 72, it is difficult to synchronize the driving of the micro display 60 with the three prisms 44, 65, and 72.

That is, the color bars as shown in FIG. 2 must be moved at a constant speed to form a color image using the color scrolling technique. However, since the conventional single-panel image display apparatus must synchronize the micro display 60 with the three prisms 44, 65, and 72 to perform scrolling, controlling the synchronization is difficult. Further, since the three prisms 44, 65, and 72 move in a circular motion, the color scrolling speed is not constant, thus impairing the quality of an image.

In addition, a large amount of noise is generated due to the driving of three motors to rotate the three prisms 44, 65, and 72, and the manufacturing costs of the conventional single-panel image display apparatus using three motors is higher compared to a color wheel method using only one motor.

SUMMARY OF THE INVENTION

The present invention provides a colored light separating device having a simple structure for color scrolling and a single-panel color image display apparatus using the same.

According to an aspect of the present invention, a single-panel color image display apparatus includes a light source; a colored light separating device, which comprises a colored light separator having a plurality of dichroic filters to separate light emitted from the light source into a plurality of colored light beams and a driving device to drive the colored light separator to scroll the separated colored light beams; and a micro display, which controls light, which is separated by the colored light separator according to color and scrolled according to the driving of the colored light separator, on a pixel-by-pixel basis according to an input image signal and forms a color image.

The driving device may enable the colored light separator to move straight, pivot, or rotate.

The plurality of dichroic filters may be of a reflective type.

The plurality of dichroic filters may be parallel to one another.

The single-panel color image display apparatus may further include a first lens array which is disposed between the light source and the colored light separator and converts light incident from the light source into condensing light.

The single-panel color image display apparatus may further include second and third lens arrays which are disposed between the colored light separator and the micro display.

The single-panel color image display apparatus may further include a relay lens which is disposed between the third lens array and the micro display.

A distance among the plurality of dichroic filters of the colored light separator may be set such that colored light beams separated by the colored light separator are incident on the same lens cell of the second lens array without color mixture.

A minimum distance by which the colored light separator may be moved along a straight line may be set such that the colored light may be moved from one lens cell to another lens cell of the second lens array.

A minimum angle by which the colored light separator may be pivoted may be set such that the colored light may be moved from one lens cell to another lens cell of the second lens array.

According to another aspect of the present invention, a colored light separating device may perform colored light separation and color scrolling, the device including: a colored light separator which includes a plurality of dichroic filters to separate incident light into a plurality of colored light beams; and a driving device which moves the colored light separator to scroll the separated colored light beams.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
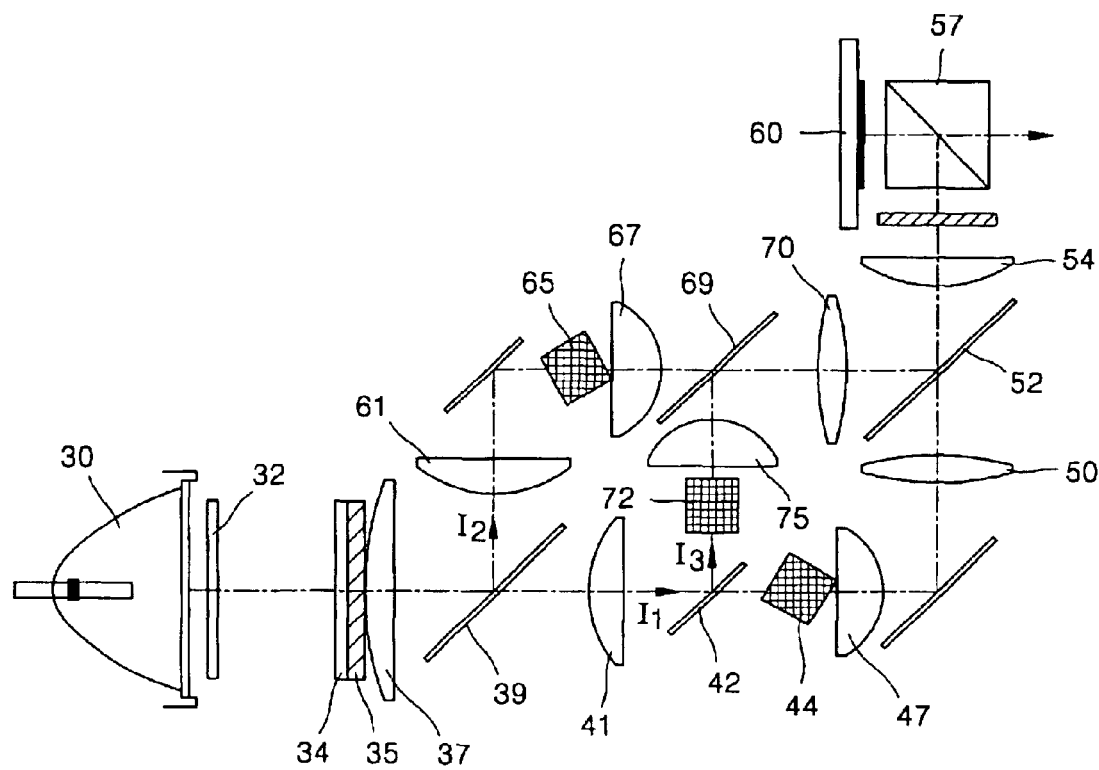
FIG. 1 shows a conventional single-panel color image display apparatus using a color scrolling technique.
Figure 2:
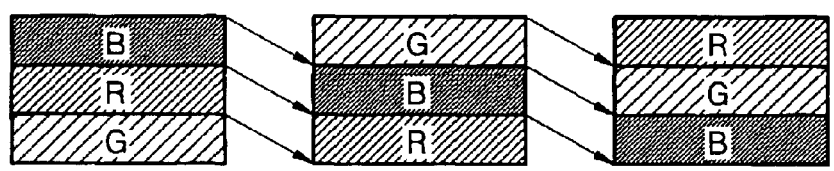
FIG. 2 is a diagram illustrating a color scrolling operation.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
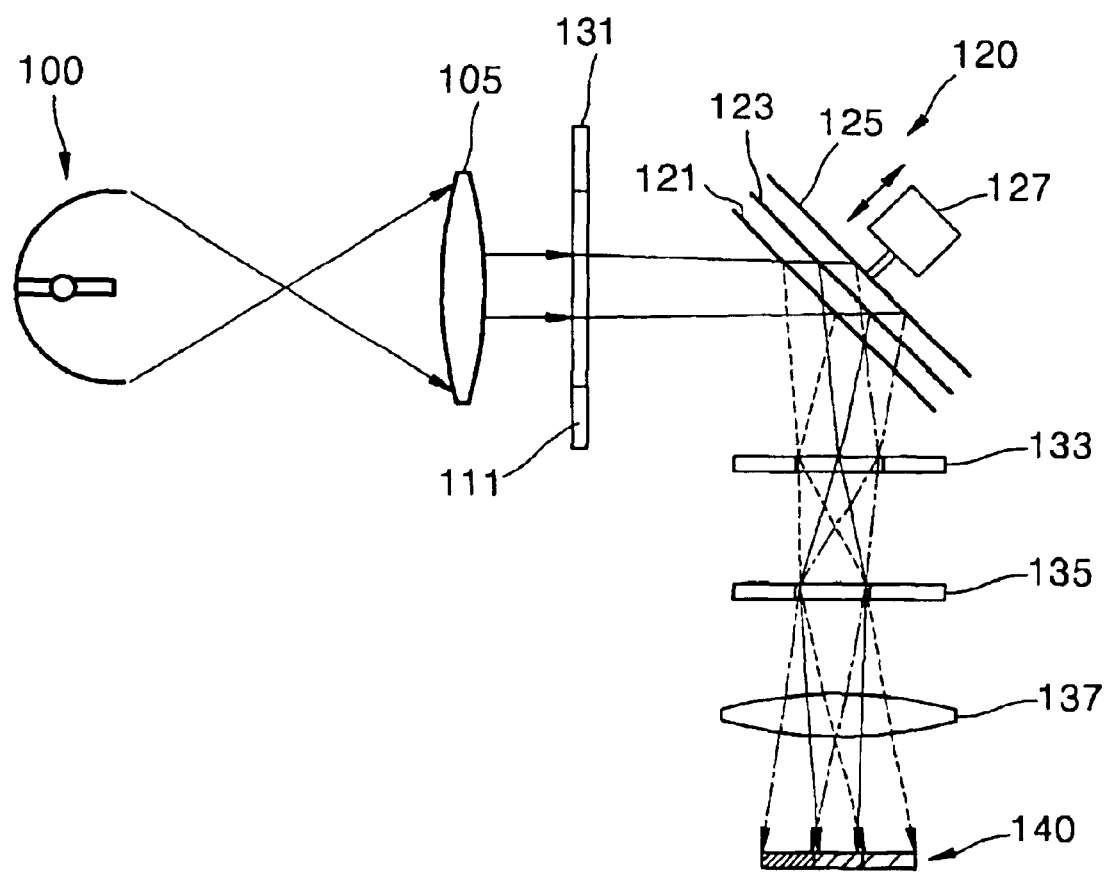
FIG. 3 schematically illustrating a single-panel color image display apparatus using a colored light separating device according to a first embodiment of the present invention.

Referring to FIG. 3, a single-panel color image display apparatus using a colored light separating device according to a first embodiment of the present invention includes an illuminating unit, a colored light separating device which separates light emitted from the illuminating unit according to color, and a micro display 140 which controls light on a pixel-by-pixel basis according to an input image signal and forms a color image.

The single-panel color image display apparatus according to the present invention may further include a first lens array 131 which is disposed between the illuminating unit and a colored light separator 120 included in the colored light separating device and makes light incident from the illuminating unit into focusing light.

The single-panel color image display apparatus, according to the present invention, may further include second and third lens arrays 133 and 135, which are disposed on an optical path between the colored light separator 120 and the micro display 140. Further, a relay lens 137 may be further included between the third lens array 135 and the micro display 140.

The illuminating unit includes a light source 100 to produce and emit white light. As shown in FIG. 3, a lamp light source having a reflecting mirror may be used as the light source 100.

FIG. 3 shows the light source 100 emitting converging light and the single-panel color image display apparatus, according to an embodiment of the present invention, and further including a collimating lens 105 which makes light emitted from the light source 100, focused, and diverged, into parallel light. Here, the light source 100 may be configured to emit light in parallel light form. The light source 100 and the light unit, including the light source 100, may be modified in various ways.

The first lens array 131 condenses light incident from the light source 100, and the light is incident on the colored light separator 120 in convergence light form.

The colored light separating device includes the colored light separator 120 to separate white incident light into, for example, red colored light R, green colored light G, and blue colored light B, and a driving device 127 to drive the colored light separator 120.

For example, the colored light separator 120 includes first, second, and third dichroic filters 121, 123, and 125 to separate white light emitted from the light source 100 into a red colored light R, a green colored light G, and a blue colored light B, respectively. The first, second, and third dichroic filters 121, 123, and 125 may be configured to reflect a red colored light R, a green colored light G, and a blue colored light B, respectively, and transmit other colored light.

The dichroic filters 121, 123, and 125 may be reflective, but may be a transmittable type, if necessary.

When white light emitted from the light source 100 is incident on the colored light separator 120 configured as presented above, the first dichroic filter 121 reflects red colored light R, from the white incident light and transmits the light of other wavelength ranges. The second dichroic filter 123 reflects the blue colored light B from the light transmitted by the first dichroic filter 121 and transmits the green colored light G. The third dichroic filter 125 reflects the green colored light G transmitted by the first and second dichroic filters 121 and 123.

Here, an order of a red colored light R, a green colored light G, and a blue colored light B reflected by the colored light separator 120 may be changed.

The first, second, and third dichroic filters 121, 123, and 125 may be disposed parallel to one another. Further a distance among the first, second, and third dichroic filters 121, 123, and 125 may be set such that colored light beams separated by the colored light separator 120 are incident on the same lens cell of the second lens array 133 without color mixture among the R, G, and B beams.

In the single-panel color image display apparatus, according to the first embodiment of the present invention, the colored light separator 120 is reciprocated along a straight line by the driving device 127 so that the colored light beams separated by the colored light separator 120 are scrolled. In FIG. 3, the colored light separator 120 is reciprocated backward and forward. The colored light separator 120 may be reciprocated along a direction parallel to an optical axis of light incident from the light source 100.

Since light which is emitted from the light source 100 and is incident on the colored light separator 120 is in a convergent light form, a focusing position of the color beams separated by the colored light separator 120 is moved right and left due to the motion of the colored light separator 120.

Accordingly, as the colored light separator 120 is reciprocated along a straight line, R, G, and B beams are repeatedly scrolled according to the motion of the colored light separator 120 so that R, G, and B color bars are scrolled on the micro display 140.

The motion speed of the colored light separator 120 is adjusted to synchronize with the operating frequency of the micro display 140.

Light which is converted into a convergent form by the first lens array 131 is incident on the colored light separator 120 and is separated by the colored light separator 120 into R, G, and B colors. Here, the R, G, and B colors are not mixed due to the difference in the lengths of the optical paths of the R, G, and B colors caused by the selective reflection of the first, second, and third dichroic filters 121, 123, and 125, and are incident on the same lens cell of the second lens array 133.

A minimum distance by which the colored light separator 120 may be moved along a straight line may be set such that the R, G, and B colors incident on the same lens cell of the second lens array 133 without color mixture among the R, G, and B colors may be moved from one lens cell to another lens cell of the second lens array 133.

Lens cells of each of the second and third lens arrays 133 and 135 match with each other in a one-to-one correspondence and may be referred to as "a fly eye lens." Further, the lens cells of the second and third lens arrays 133 and 135 match with lens cells 111 of the first lens array 131 in a one-to-one correspondence.

The second and third lens arrays 133 and 135 may have the same focal length.

The second lens array 133 may be disposed at a focal point of the first lens array 131, and the third lens array 135 may be disposed at a focal point of the second lens array 133.

In this case, the R, G, and B colors, which are condensed by the lens cells 111 of the first lens array 131 used as a condensing lens and separated by the first, second, and third dichroic filters 121, 123, and 125 of the colored light separator 120, have optical paths of different lengths due to the first, second, and third dichroic filters 121, 123, and 125 which are separated from one another, thus focusing on different locations of the same lens cell of the second lens array 133. The R, G, and B colors are converted in a divergence light form by the second lens array 133 and are formed into parallel light by the third lens array 135.

The R, G, and B colors in parallel light form passing through the second and third lens arrays 133 and 135 are incident on different locations on the micro display 140 via the relay lens 137. The relay lens 137 may be a single lens as shown in FIG. 3, or a lens group including two or more lenses.

In a case in which the first, second, and third lens arrays 131, 133, and 135 and the relay lens 137 are provided, the light condensed by the first lens array 131 is sent in a one-to-one correspondence by the second and third lens arrays 133 and 135, and R, G, and B color bars are formed on the micro display 140 by the relay lens 137.

The micro display 140 controls the colored light beams to be focused in the form of R, G, and B color bars according to an input image signal, thus forming a color image.

Figure 4:
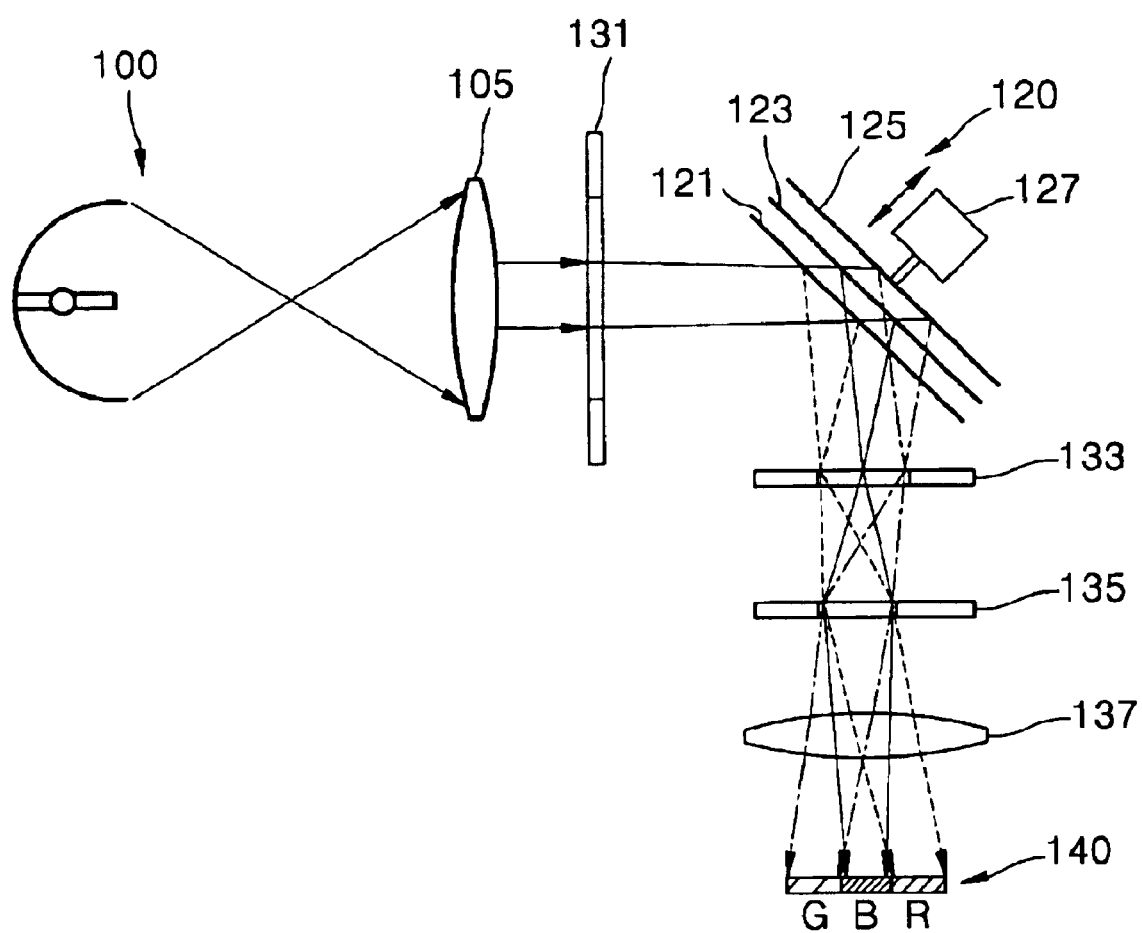
FIGS. 4 through 6 illustrate scrolling of R, G, and B color bars when a colored light separator is moved backward and forward.
Figure 5:
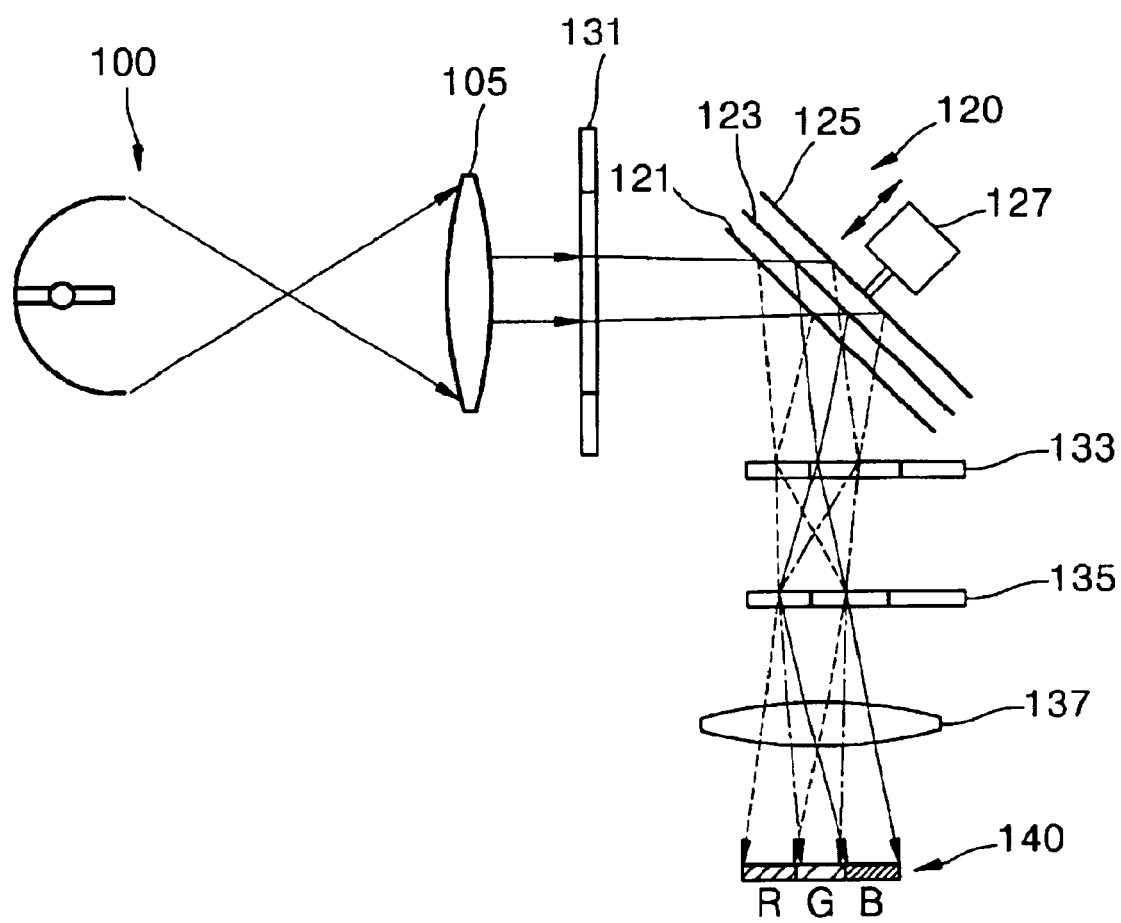
Figure 6:
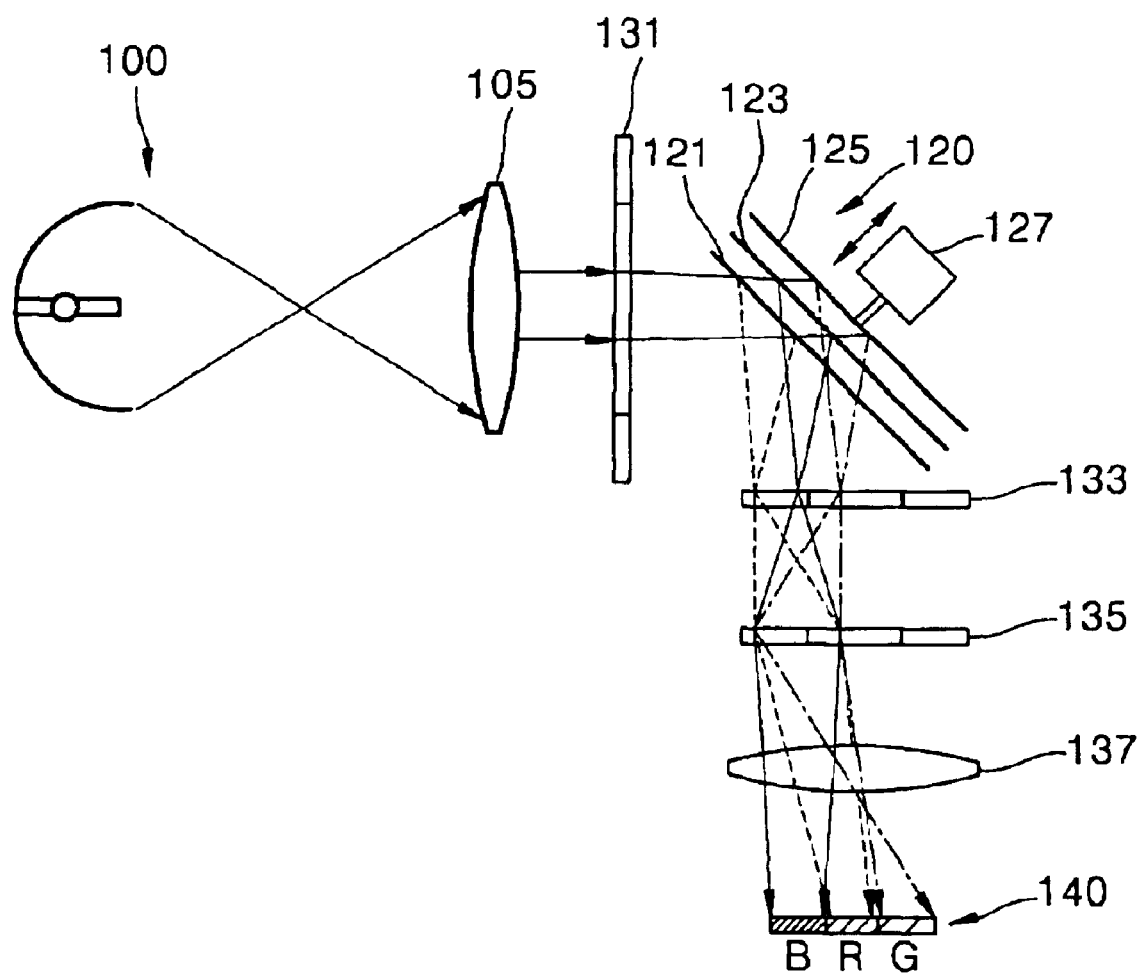

The R, G, and B color bars focused on the micro display 140 are scrolled as shown in FIGS. 4 through 6 according to the driving of the colored light separator 120.

FIGS. 4 through 6 illustrate scrolling of the R, G, and B color bars when the colored light separator 120 is moved backward and forward.

As is illustrated in FIGS. 4 through 6, as the colored light separator 120 moves along a straight line, the R, G, and B color bars are scrolled. Thus, the micro display 140 processes image information for each pixel to synchronize with the movement of the R, G, and B color bars according to the straight and reciprocating motion of the colored light separator 120, thus forming a color image.

The color image formed by the micro display 140 is magnified by a projecting lens unit (not shown) and is projected onto a screen (not shown).

Figure 7:
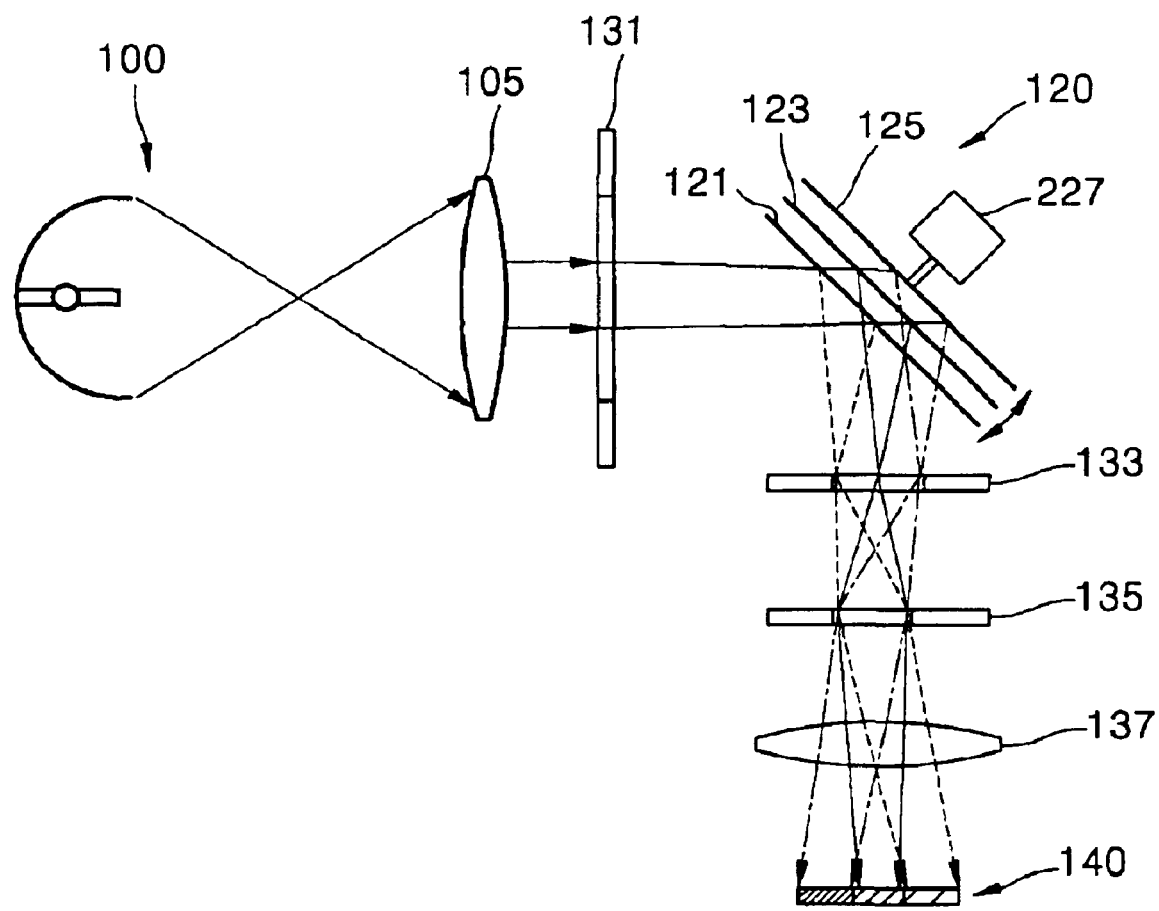
FIG. 7 schematically illustrate a single-panel color image display apparatus using a colored light separating device according to a second embodiment of the present invention.

FIG. 7 schematically illustrates a single-panel color image display apparatus using a colored light separating device according to a second embodiment of the present invention. The colored light separating device and the single-panel color image display apparatus, according to the second embodiment of the present invention, provide for pivoting a colored light separator 120 and reciprocating the colored light separator 120 by a driving device 227 to adjust a tilt angle of the colored light separator 120 so that colored light beams separated by the colored light separator 120 are scrolled. In FIG. 7, the same reference numerals as those in FIG. 3 represent the same elements, and thus their description will be omitted.

If the tilt angle of the colored light separator 120 is adjusted due to the pivoting and reciprocating motion of the colored light separator 120, as in the second embodiment of the present invention, R, G, and B colors are repeatedly scrolled according to the motion of the colored light separator 120 so that R, G, and B color bars are scrolled on a micro display 140. At this time, the pivoting motion speed of the colored light separator 120 is adjusted to synchronize with the operating frequency of the micro display 140.

When color scrolling is performed due to the pivoting motion of the colored light separator 120 as described above, a minimum angle by which the colored light separator 120 may be pivoted may be set such that the R, G, and B colors incident on the same lens cell of the second lens array 133 without color mixture among the R, G, and B colors may be moved from one lens cell to another lens cell of the second lens array 133.

Figure 8:
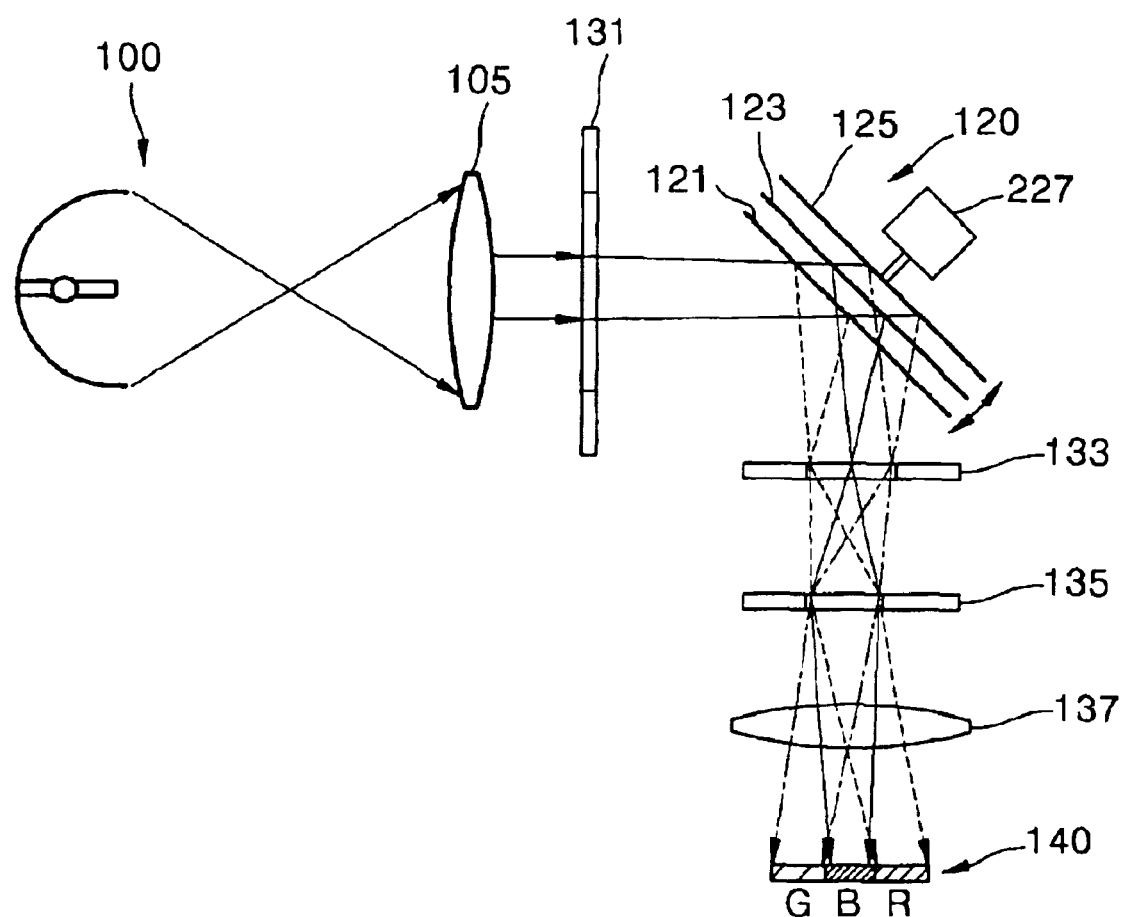
FIGS. 8 through 10 illustrate scrolling of R, G, and B color bars when a tilt angle of a colored light separator is adjusted.
Figure 9:
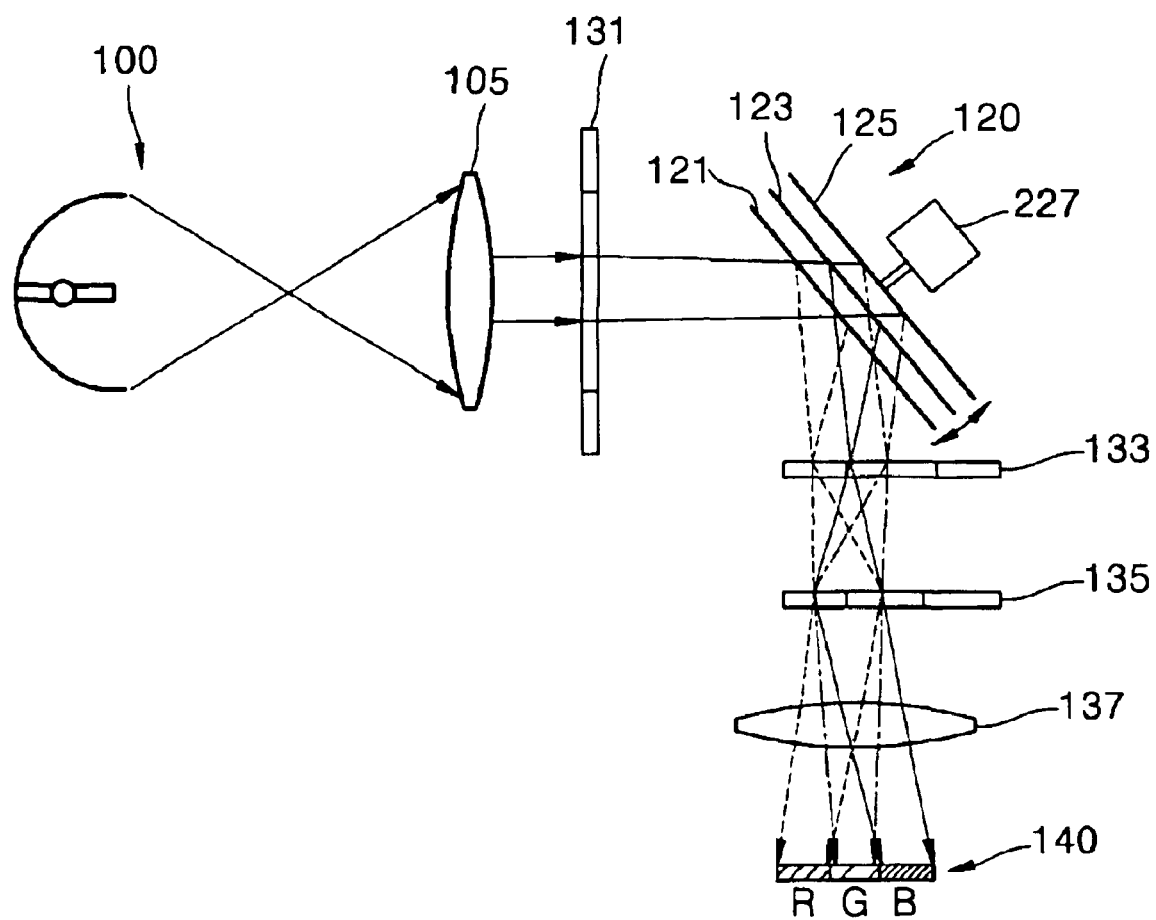
Figure 10:
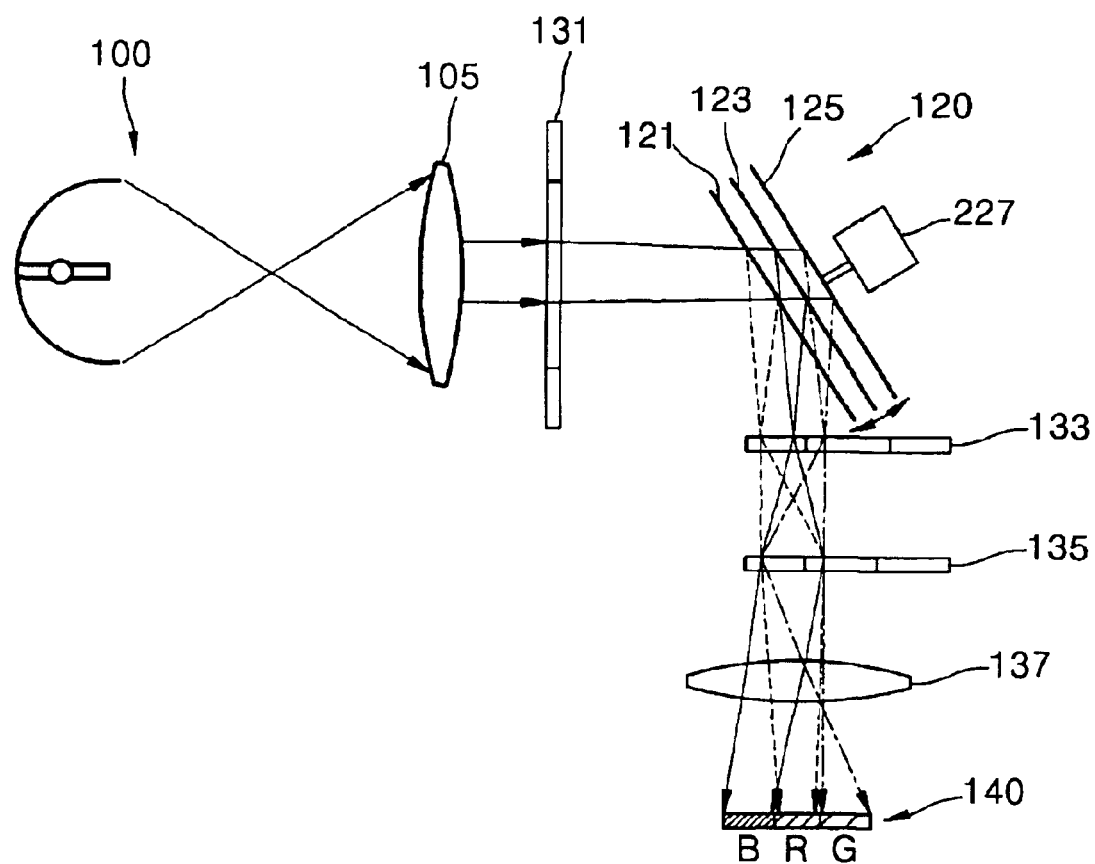

FIGS. 8 through 10 illustrate scrolling of the R, G, and B color bars when the tilt angle is adjusted due to the pivoting motion of the colored light separator 120.

FIGS. 8 through 10 illustrate that, as the tilt angle is adjusted due to the pivoting motion of the colored light separator 120, the R, G, and B color bars are scrolled. Thus, the micro display 140 processes image information for each pixel to synchronize with the movement of the R, G, and B color bars according to the pivoting and reciprocating motion of the colored light separator 120, thus forming a color image.

Figure 11:
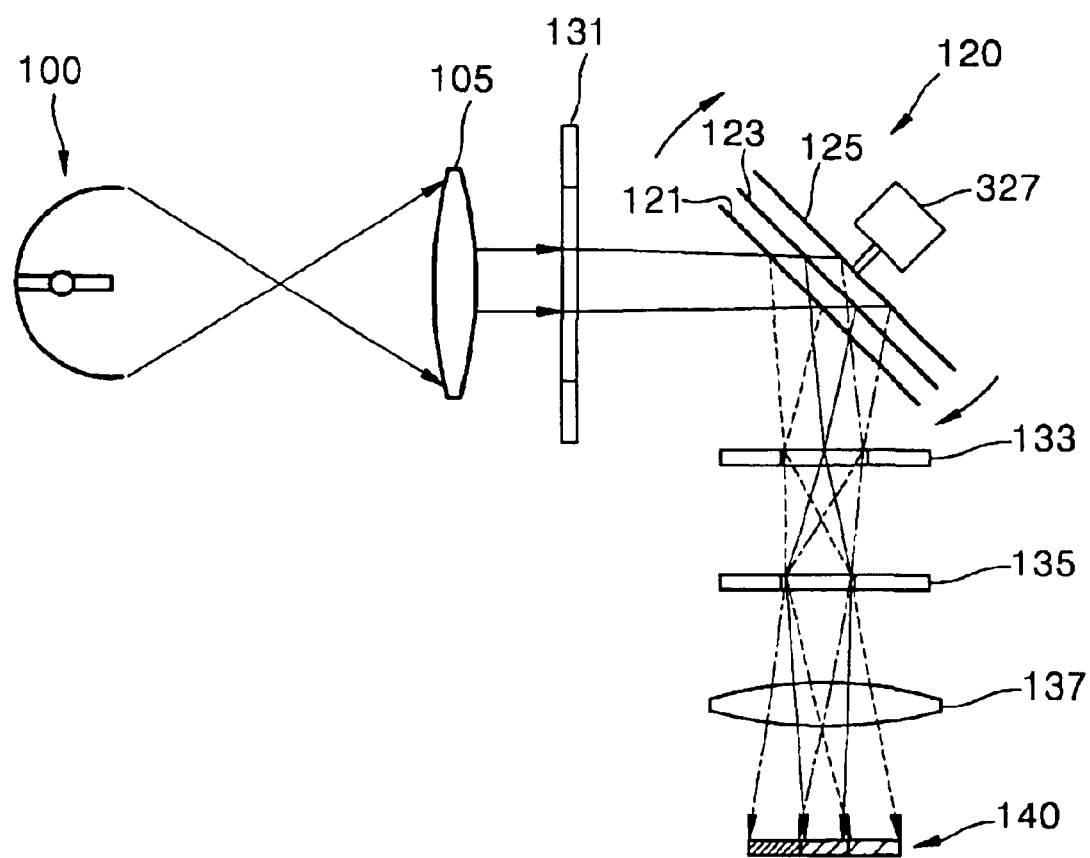
FIG. 11 schematically illustrates a single-panel color image display apparatus using a colored light separating device according to a third embodiment of the present invention.

FIG. 11 is a schematic illustration of a single-panel color image display apparatus using a colored light separating device according to a third embodiment of the present invention.

FIG. 11 illustrates another color scrolling method performed by the adjustment of a tilt angle of a colored light separator 120. The colored light separating device and the single-panel color image display apparatus, according to the third embodiment of the present invention, rotate the colored light separator 120 using a driving device 327 so that the colored light beams separated by the colored light separator 120 are scrolled. In FIG. 11, the same reference numerals as those in FIG. 7 represent the same elements, and thus their description will be omitted.

Since color scrolling is performed due to the motion of the colored light separator 120 itself corresponding to a single component in the present invention, continuity and consistency of color scrolling may be guaranteed, and the scrolling speed of the color bars may be kept constant, compared to a conventional single-panel color image display apparatus in which color scrolling is performed by the rotation of three prisms (44, 65, and 72 in FIG. 1).

FIGS. 3, 7, and 11 only show various specific examples of the single-panel color image display apparatus according to the present invention, but the present invention is not limited to the optical structures of FIGS. 3, 7, and 11. The single-panel color image display apparatus according to the present invention may cover various changes in form and details made therein without departing from the spirit and scope of the present invention as defined by the appended claims.

Although a colored light separating device according to an embodiment of the present invention is used for colored light separation and a color scrolling operation in a single-panel color image display apparatus, the colored light separating device may be applied to various optical systems in which colored light separation and the color scrolling operation are required.

As described above, since a colored light separating device and a single-panel color image display apparatus using the same, in accordance with an embodiment of the present invention, perform color scrolling due to the driving of the colored light separating device itself, the structure of the colored light separating device enabling color scrolling is simplified, continuity and consistency of color scrolling may be guaranteed, and the scrolling speed of color bars may be kept constant.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A single-panel color image display apparatus comprising:
    a light source;
    a colored light separating device comprising:
        a colored light separator having a plurality of dichroic filters to separate light emitted from the light source into a plurality of colored light beams wherein the plurality of dichroic filters are parallel to one another; and
        a driving device to drive the colored light separator to scroll the separated light beams, and
    a micro display to control separated light beams that are scrolled, on a pixel-by-pixel basis according to an input image signal to form a color image.

2. The single-panel color image display apparatus of claim 1, wherein the driving device enables the colored light separator to move in one the following fashions: move along a straight line, pivot, or rotate.

3. The single-panel color image display apparatus of claim 2, wherein the plurality of dichroic filters are a reflective type.

4. The single-panel color image display apparatus of claim 2, wherein the driving device enables the colored light separator to reciprocate along a straight line so that the colored light beams that are separated are scrolled.

5. The single-panel color image display apparatus of claim 1, wherein the plurality of dichroic filters are a reflective type.

6. The single-panel color image display apparatus of claim 5, wherein the plurality of dichroic filters are parallel to one another.

7. The single-panel color image display apparatus of claim 1, further comprising a collimating lens that converts light emitted from the light source into parallel light.

8. The single-panel color image display apparatus of claim 1, further comprising a first lens array, disposed between the light source and the colored light separator, to convert light incident from the light source into condensing light.

9. The single-panel color image display apparatus of claim 8, further comprising second and third lens arrays disposed between the colored light separator and the micro display.

10. The single-panel color image display apparatus of claim 9, further comprising a relay lens disposed between the third lens array and the micro display.

11. The single-panel color image display apparatus of claim 9, wherein a distance among the plurality of dichroic filters of the colored light separator is set such that colored light beams separated by the colored light separator are incident on a same lens cell of the second lens array without color mixture.

12. The single-panel color image display apparatus of claim 9, wherein the colored light separator moves a minimum distance along the straight line such that the colored light is moved from one lens cell to another lens cell of the second lens array.

13. The single-panel color image display apparatus of claim 9, wherein the colored light separator pivots a minimum angle such that the colored light is moved from one lens cell to another lens cell of the second lens array.

14. The single-panel color image display apparatus of claim 9, wherein the second and third lens arrays have the same focal length.

15. The single-panel color image display apparatus of claim 14, wherein the second lens array is disposed at a focal point of the first lens array, and the third lens array is disposed at a focal point of the second lens array.

16. The colored light separating device of claim 9, wherein the second lens array is disposed at a focal point of the first lens array, and the third lens array is disposed at a focal point of the second lens array.

17. The colored light separating device of claim 9, wherein the colored light beams which are condensed by lens cells of the first lens array used as a condensing lens and separated by a first, a second, and a third dichroic filter of the colored light separator, have optical paths of different lengths due to the first, second, and third dichroic filters which are separated from one another to focus on different locations of a same lens cell of the second lens array to convert the colored light beams into a divergent light form by the second lens array and to form into parallel light by the third lens array.

18. The colored light separating device of claim 1, wherein the plurality of dichroic filters are a transmittable type.

19. The colored light separating device of claim 1, wherein a focusing position of the color beams separated by the colored light separator is moved right and left due to the motion of the colored light separator.

20. A colored light separating device to perform colored light separation and color scrolling, the device comprising:
 a colored light separator having a plurality of dichroic filters to separate incident light into a plurality of colored light beams wherein the plurality of dichroic filters are parallel to one another; and
 a driving device to move the colored light separator to scroll the separated colored light beams.

21. The colored light separating device of claim 20, wherein the driving device enables the colored light separator to move in one of the following fashions: move along a straight line, pivot, or rotate.

22. The colored light separating device of claim 21, wherein the plurality of dichroic filters are a reflective type.

23. The colored light separating device of claim 21, wherein the driving device enables the colored light separator to reciprocate along a straight line so that the colored light beams that are separated are scrolled.

24. The colored light separating device of claim 20, wherein the plurality of dichroic filters are a reflective type.

25. The colored light separating device of claim 20, wherein the plurality of dichroic filters are a transmittable type.

26. The colored light separating device of claim 20, wherein a focusing position of the color beams separated by the colored light separator is moved right and left due to the motion of the colored light separator.

* * * * *

UNITED STATES PATENT AND TRADEMARK OFFICE
CERTIFICATE OF CORRECTION

PATENT NO. : 6,811,263 B2
DATED : November 2, 2004
INVENTOR(S) : Sung-Ha Kim et al.

It is certified that error appears in the above-identified patent and that said Letters Patent is hereby corrected as shown below:

Title page,
Item [75], Inventors, change "Sung-ha Kim, Gyeongi-do" to -- Sung-ha Kim, Gyeonggi-do -- and change "Kun-ho Cho, Cyconggi-do" to -- Kun-ho Cho, Gyeonggi-do --.
Item [57], ABSTRACT,
Line 1, change "lighting" to -- light --.

Signed and Sealed this

Twenty-sixth Day of April, 2005

JON W. DUDAS
*Director of the United States Patent and Trademark Office*